(12) United States Patent
Jaskot et al.

(10) Patent No.: US 11,761,543 B2
(45) Date of Patent: *Sep. 19, 2023

(54) LABYRINTH SEAL

(71) Applicant: ORION ENGINEERED SEALS, LLC, Cincinnati, OH (US)

(72) Inventors: Randall Jaskot, Dousman, WI (US); Woodrow Nepa, Geneva, NY (US); Todd Brickson, St. Charles, MO (US)

(73) Assignee: ORION ENGINEERED SEALS, LLC, Cincinnati, OH (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/396,834

(22) Filed: Aug. 9, 2021

(65) Prior Publication Data
US 2022/0025974 A1 Jan. 27, 2022

Related U.S. Application Data

(60) Continuation of application No. 15/958,193, filed on Apr. 20, 2018, now Pat. No. 11,085,542, which is a (Continued)

(51) Int. Cl.
*F16J 15/44* (2006.01)
*F16J 15/447* (2006.01)
(Continued)

(52) U.S. Cl.
CPC ......... *F16J 15/4476* (2013.01); *F16J 15/002* (2013.01); *F16J 15/32* (2013.01); *F16J 15/4472* (2013.01)

(58) Field of Classification Search
CPC .... F16J 15/447; F16J 15/4472; F16J 15/4474; F16J 15/4476; F16J 15/32; F16J 15/002
See application file for complete search history.

(56) References Cited

U.S. PATENT DOCUMENTS 4,315,566 A * 2/1982 Greener ............... F16C 13/022
492/22
4,373,759 A * 2/1983 Greener ............... F16C 35/073
384/480
(Continued)

OTHER PUBLICATIONS

First Office Action dated Jul. 11, 2022 in related German Application No. 11 2013 007 817.1 filed May 20, 2021 (5 pages) with Google machine translation (4 pages).

*Primary Examiner* — Eugene G Byrd
*Assistant Examiner* — L. Susmitha Koneru
(74) *Attorney, Agent, or Firm* — Daniel F. Nesbitt; Nesbitt IP LLC

(57) ABSTRACT

A labyrinth seal including a stator and a non-contacting rotor, and annular elastomeric seals. The confronting surfaces of the stator and rotor define at least one interface passage, including a radially-outermost annular interface passage between an annular, outermost, radially-extending projection of the stator and an annular rearwardly-extending distal projection of the rotor that overlaps the radially-extending projection of the stator, the radially-outermost annular interface passage tapering outwardly and rearwardly at an acute angle relative to an axial reference line. The annular elastomeric seals are stationary with the stator during dynamic operation of the rotor, and are not contacted by a surface of the rotor during dynamic operation. The interface can also have two radially-disposed exclusion chambers, the outer exclusion chamber being defined in part by a radially-inboard projection of the rotor. The stator can have a projection providing a contact avoidance interface position inboard of at least two contaminant-excluding interfaces.

9 Claims, 9 Drawing Sheets

Related U.S. Application Data continuation of application No. 15/434,247, filed on Feb. 16, 2017, now Pat. No. 10,724,640, which is a division of application No. 14/455,162, filed on Aug. 8, 2014, now Pat. No. 9,587,743, which is a continuation-in-part of application No. PCT/US2013/025505, filed on Feb. 11, 2013.

(60) Provisional application No. 61/597,587, filed on Feb. 10, 2012.

(51) Int. Cl.
*F16J 15/00* (2006.01)
*F16J 15/32* (2016.01)

(56) References Cited

U.S. PATENT DOCUMENTS

| | | | | |
|---|---|---|---|---|
| 4,458,957 A * | 7/1984 | Greener | F16J 15/406 | 277/420 |
| 4,743,034 A * | 5/1988 | Kakabaker | F16J 15/4474 | 384/480 |
| 5,074,408 A * | 12/1991 | Smith | F16C 13/022 | 384/465 |
| 5,951,020 A * | 9/1999 | Orlowski | F16J 15/4474 | 277/423 |
| 6,017,037 A * | 1/2000 | Fedorovich | F16J 15/164 | 277/423 |
| 6,082,528 A * | 7/2000 | Habberley | B65G 39/09 | 198/842 |
| 6,206,182 B1 * | 3/2001 | Wilson | B65G 39/09 | 198/842 |
| 6,485,022 B1 * | 11/2002 | Fedorovich | F16J 15/4478 | 277/303 |
| 7,839,294 B2 * | 11/2010 | Orlowski | F16C 13/022 | 340/682 |
| 7,857,321 B2 * | 12/2010 | Roddis | F16J 15/4478 | 277/412 |
| 8,047,548 B2 * | 11/2011 | Roddis | F16J 15/344 | 384/477 |
| 2001/0002742 A1 * | 6/2001 | Orlowski | F16J 15/4478 | 277/361 |
| 2002/0167131 A1 * | 11/2002 | Orlowski | F16J 15/4478 | 277/371 |
| 2007/0241513 A1 * | 10/2007 | Roddis | F16J 15/4478 | 277/412 |
| 2008/0001362 A1 | 1/2008 | Chitren et al. | | |
| 2008/0050261 A1 * | 2/2008 | Roddis | F16J 15/3444 | 418/104 |
| 2013/0033139 A1 * | 2/2013 | Tones | H02K 5/124 | 310/90 |
| 2014/0232071 A1 * | 8/2014 | Orlowski | F16J 15/187 | 277/418 |
| 2015/0198252 A1 * | 7/2015 | Jason | F16J 15/164 | 277/408 |

* cited by examiner

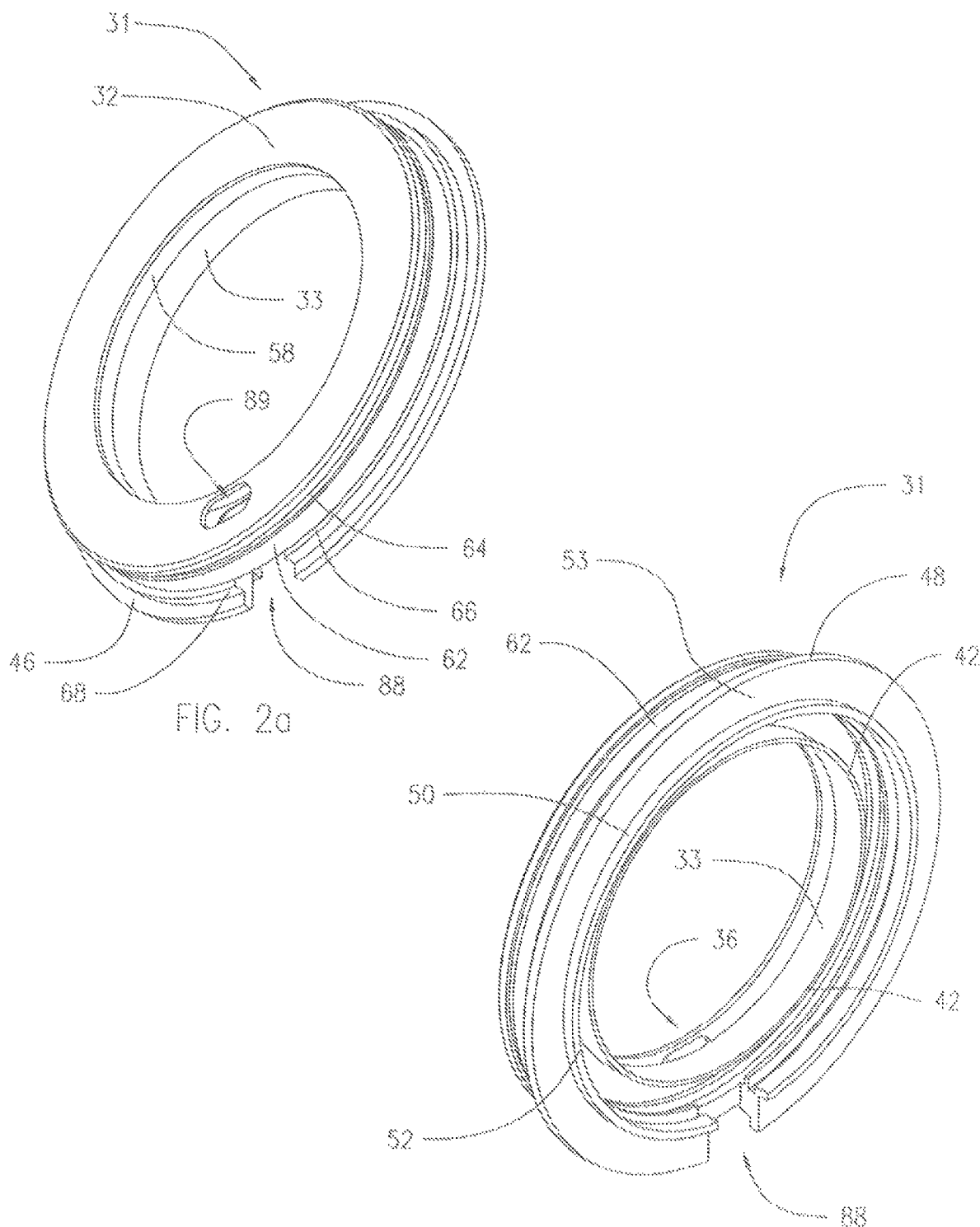

LABYRINTH SEAL

CROSS-REFERENCE TO RELATED APPLICATIONS

This application is a continuation of U.S. application Ser. No. 15/958,193, filed Apr. 20, 2018, which is a continuation of U.S. application Ser. No. 15/434,247, filed Feb. 16, 2017, now U.S. Pat. No. 10,724,640, which is a divisional of U.S. application Ser. No. 14/455,162, filed Aug. 8, 2014, now U.S. Pat. No. 9,587,743, which is a continuation-in-part application of PCT International Application No. PCT/US2013/025505, filed Feb. 11, 2013, which claims the benefit of U.S. Provisional Application No. 61/597,587, filed Feb. 10, 2012, the disclosures of which are incorporated herein by reference in their entireties.

TECHNICAL FIELD

The present invention relates generally to a shaft-sealing and bearing protecting labyrinth seal for a shaft-driven rotating equipment.

BACKGROUND OF THE INVENTION

Adequate maintenance of rotating equipment is difficult to obtain because of extreme equipment duty cycles, the lessening of service factors, design and the lack of spare rotating equipment in many processing plants. This is especially true of process pumps, slurry pumps, machine tool spindles, wet end paper machine rolls, aluminum rolling mills and steam quench pumps and other equipment utilizing extreme contamination that can affect lubrication of the bearings of the rotating equipment.

Various forms of shaft sealing devices have been utilized to try to protect the integrity of the bearing environment, including rubber lip seals, clearance labyrinth seals, and attraction magnetic seals. Lip seals or O-ring shaft seals can quickly wear out and fail and are also known to permit excessive amounts of moisture and other contaminants to migrate into the lubricant (oil or grease) reservoir of the operating equipment even before failure had the interface between the rotor and the stator exposed to the contaminates or lubricants at the radial extremity of the seal.

Labyrinth-type seals involving closely related stator and rotor rings, which do not contact each other but define labyrinth passages between them have been devised and utilized and are illustrated in U.S. Pat. Nos. 4,706,968, 4,989,883, 5,069,461, and 6,419,233, the disclosures of which are incorporated by reference in their entireties.

SUMMARY OF THE INVENTION

The present invention provides an improvement to labyrinth seals for protecting bearings from lubricant leakage, and entry of liquid and vapor contaminants.

The present invention relates to an improvement to a labyrinth seal having a stator and a rotor, and one or more annular elastomeric seals disposed between the confronting surfaces of the stator and rotor.

An aspect of the present invention is a labyrinth seal having a radially-outermost annular interface between the stator and the rotor that defines the initial entry point of liquid or vapor contaminant into the seal. The entrance into and pathway along the interface is directed radially inwardly to promote expulsion of contaminant that encroaches into the interface during dynamic operation of the seal.

Another aspect of the present invention is a labyrinth seal including at least one annular elastomeric seal that is associated with, and stationary with, the stator during dynamic operation of the rotor, and is not contacted by a surface of the rotor during dynamic operation of the rotor.

Another aspect of the present invention is a labyrinth seal with an interface pattern between the confronting surfaces of the stator and rotor that define two radially-disposed exclusion chambers, including a radially-outside exclusion chamber and a radially-inside exclusion chamber, to enhance sealing performance.

Another aspect of the present invention is a labyrinth seal with radially-most exclusion chamber defined in part by a radially-inboard projection of the rotor, for expelling contaminant liquid outward radially, to enhance sealing performance.

Another aspect of the present invention is a labyrinth seal including a contact avoidance interface between the stator and the rotor that is positioned in an intermediate portion of the labyrinth pathway, that is inboard of at least two contaminant-excluding interfaces and at least one lubricant-excluding interface. This feature ensures that any wear associated with dynamic contact of the rotor with the stator does not damage the important excluding interfaces.

Another aspect of the present invention is a labyrinth seal with a lubricant-contacted surface of the stator having a lubricant collecting groove having a tapered surface that improves the flow of lubricant through a drain in the bottom of the stator, back to the lubrication sump of the rotating equipment.

The present invention also relates to a labyrinth seal including a stator and a non-contacting rotor, and including one or more annular elastomeric seals, and at least one interface passage disposed between the confronting surfaces of the stator and rotor, the at least one interface passage including a radially-outermost annular interface passage between an annular, outermost, radially-extending projection of the stator and an annular rearwardly-extending distal projection of the rotor that includes an annular inner surface that overlaps the radially-extending projection of the stator, the radially-outermost annular interface passage tapering outwardly and rearwardly at an acute angle relative to an axial reference line.

The present invention also relates to a labyrinth seal including a stator and a non-contacting rotor, and including at least one annular elastomeric seal, wherein the at least one annular elastomeric seal is stationary with the stator, and is not contacted by a surface of the rotor during dynamic operation.

The present invention further relates to a labyrinth seal including a stator and a non-contacting rotor, and including at least one annular elastomeric seal, wherein the confronting surfaces of the stator and rotor define two radially-disposed exclusion chambers including a radially-outer exclusion chamber and a radially-inner exclusion chamber.

The present invention further relates to a labyrinth seal including a stator and a non-contacting rotor, and including at least one annular elastomeric seal, further including a contact avoidance interface disposed in an intermediate portion of the labyrinth pathway between the stator and the rotor, that is inboard of at least two contaminant-excluding interfaces and at least one lubricant-excluding interface, that provides a first interface of contact between the confronting surfaces of the stator and rotor in the event the rotor moves axially toward the stator during dynamic operation of the seal.

The present invention further relates to a labyrinth seal including a stator and a non-contacting rotor, and including at least one annular elastomeric seal, wherein the confronting surfaces of the stator and rotor define a radially-outside exclusion chamber that is defined in part by a radially-inboard projection of the rotor, for expelling contaminant liquid outward radially during dynamic operation, to enhance sealing performance.

The present invention also relates to a labyrinth seal including a stator and a non-contacting rotor, and including at least one annular elastomeric seal, wherein the stator has a lubricant collecting groove having a tapered surface that improves the flow of lubricant through a drain in the bottom of the stator.

BRIEF DESCRIPTION OF THE FIGURES

The invention will be more clearly understood from the following detailed description of representative embodiments thereof read in conjunction with the accompanying drawings that form a part of this disclosure.

FIGS. 2a and 2b show perspective views of the outer face and inner face, respectively, of the stator.

DETAILED DESCRIPTION OF THE INVENTION

Figure 1A:
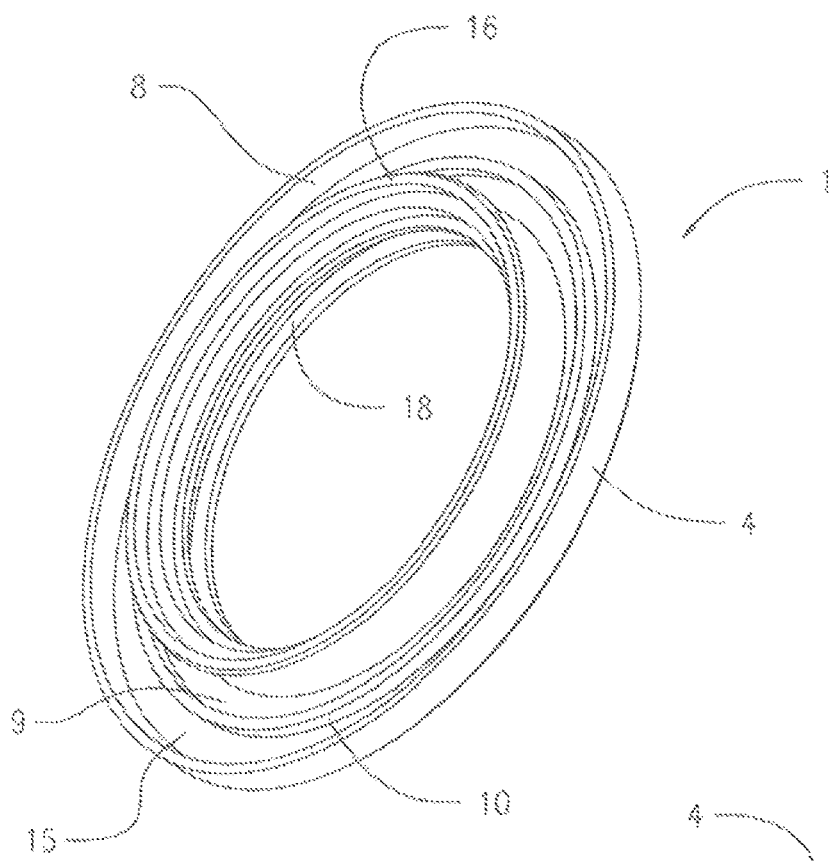
FIGS. 1a and 1b show perspective views of the inner face and outer face, respectively, of the rotor.
Figure 1B:
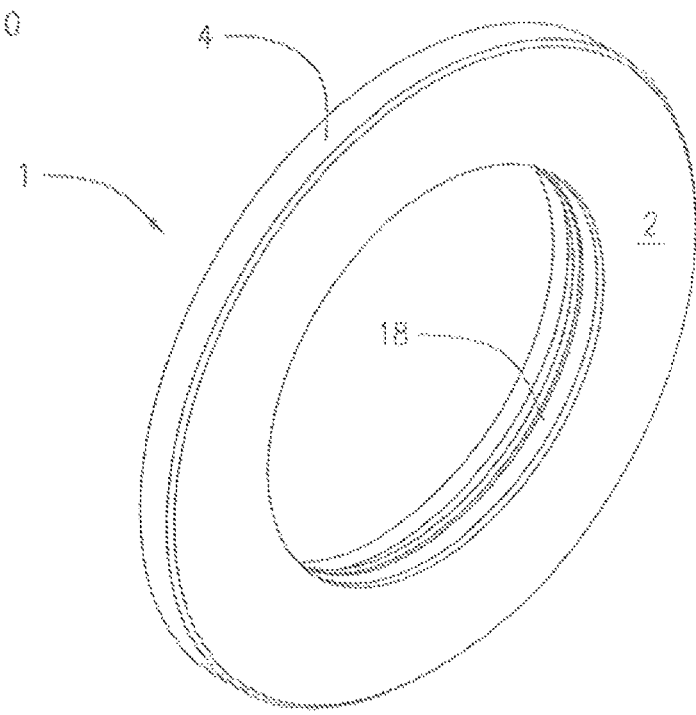

FIGS. 1a, 1b and 3-5 show a rotor 1 that includes a forward-facing annular wall 2 extending radially from an inner diameter (ID) edge proximate the shaft 90 to an outer diameter (OD) edge, and a first distal annular projection 4 extending rearwardly from the forward wall 2 to a distal end 6. The annular distal projection 4 has an inner annular surface 8 that tapers outwardly and rearwardly at angle θ relative to the axial reference line. The inner annular surface 8 is typically a machined, frustoconical-shaped surface having an acute angle θ of at least 1°, more typically at least 2°, moreso typically at least 3°, and up to 45°, typically up to 15°, more typically up to 10°, and moreso typically up to 5°.

A second intermediate annular projection 10 extends to a distal end 12 having a surface substantially perpendicular to an axial reference line 100, and has an inner annular surface 13 that extends substantially parallel to the axial reference line 100. The second intermediate projection 10 with the distal projection 4 define a channel surface 9 therebetween.

A third proximal annular projection 14 extends rearwardly to a distal end 16. The third proximal projection 14 has at least one first annular groove 18 formed in the inner surface of the third projection 14 proximate the forward wall 2 for retaining a corresponding first elastomeric seal 80, which seals the annular interface between the rotor 1 and the shaft 90. The elastomeric seal 80 is compressed on the equipment shaft and seals any external contaminants from encroaching along the equipment shaft 90 and into the rotating equipment, and also prevents oil or grease lubricant within the rotating equipment from exiting along the shaft 90 to atmosphere. The elastomeric seal(s) 80 grips to the shaft 90 to drive the rotor during dynamic operation of the equipment.

A first annular shoulder 20 is formed in the inner surface of the third projection 14, axially rearward from the first annular groove 18, and a second annular shoulder 22 is formed in the inner surface rearwardly from the second annular shoulder 22, which defines the end 16. The distal end 16 has a surface substantially perpendicular to the axial reference line 100. The third projection 14 with the second intermediate projection 10 define a channel surface 15 therebetween.

FIGS. 2a, 2b, and 3-5 show a stator 31 that includes an annular body 34 having a rearward-facing annular face 32, having a wall 42 with an inner-diameter annular surface 33 proximate the shaft 90, and an outer-diameter annular surface 62 that is configured for press-fit insertion into a cylindrical bore in the interior of the housing H of the equipment. The press-fit interface of the OD annular surface 62 provides a primary sealing of the stator within the housing. An annular groove 64 formed into the OD annular surface 62 can receive an optional sealant as a secondary sealant to prevent leakage of lubricant along the surface 62.

A deep, annular groove 36 formed into the inner surface 33 of the body 34 proximate to the rear face 32, defines a tapered forward wall 58, providing a lubricant return groove. The tapering of the forward wall 58 improves the rate of return of the lubricant down to the drain 89 and back to the sump of the rotating equipment.

Figure 4:
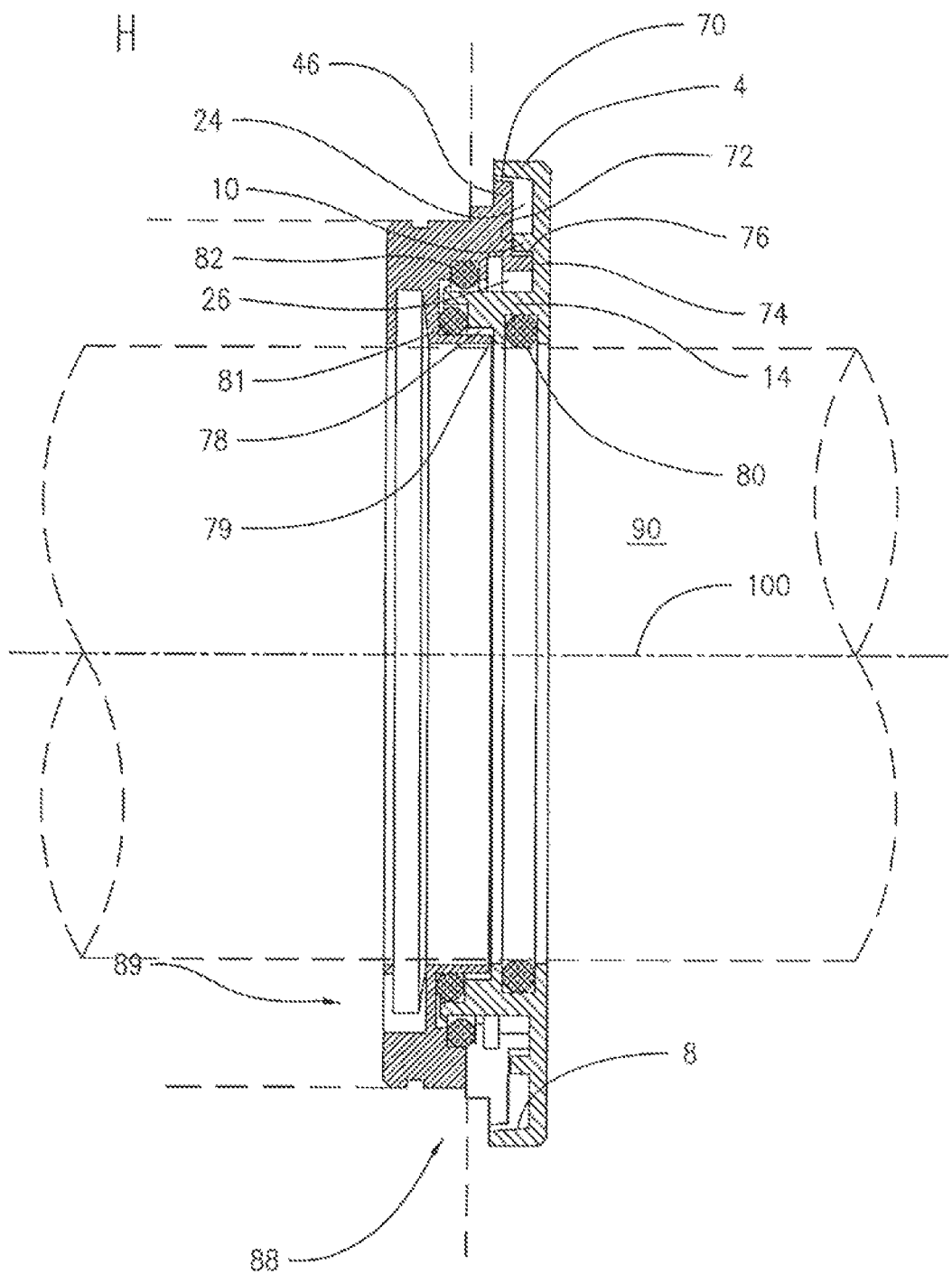
FIG. 4 shows a cross-sectional view of the rotor engaged with the stator on a shaft.
Figure 5:
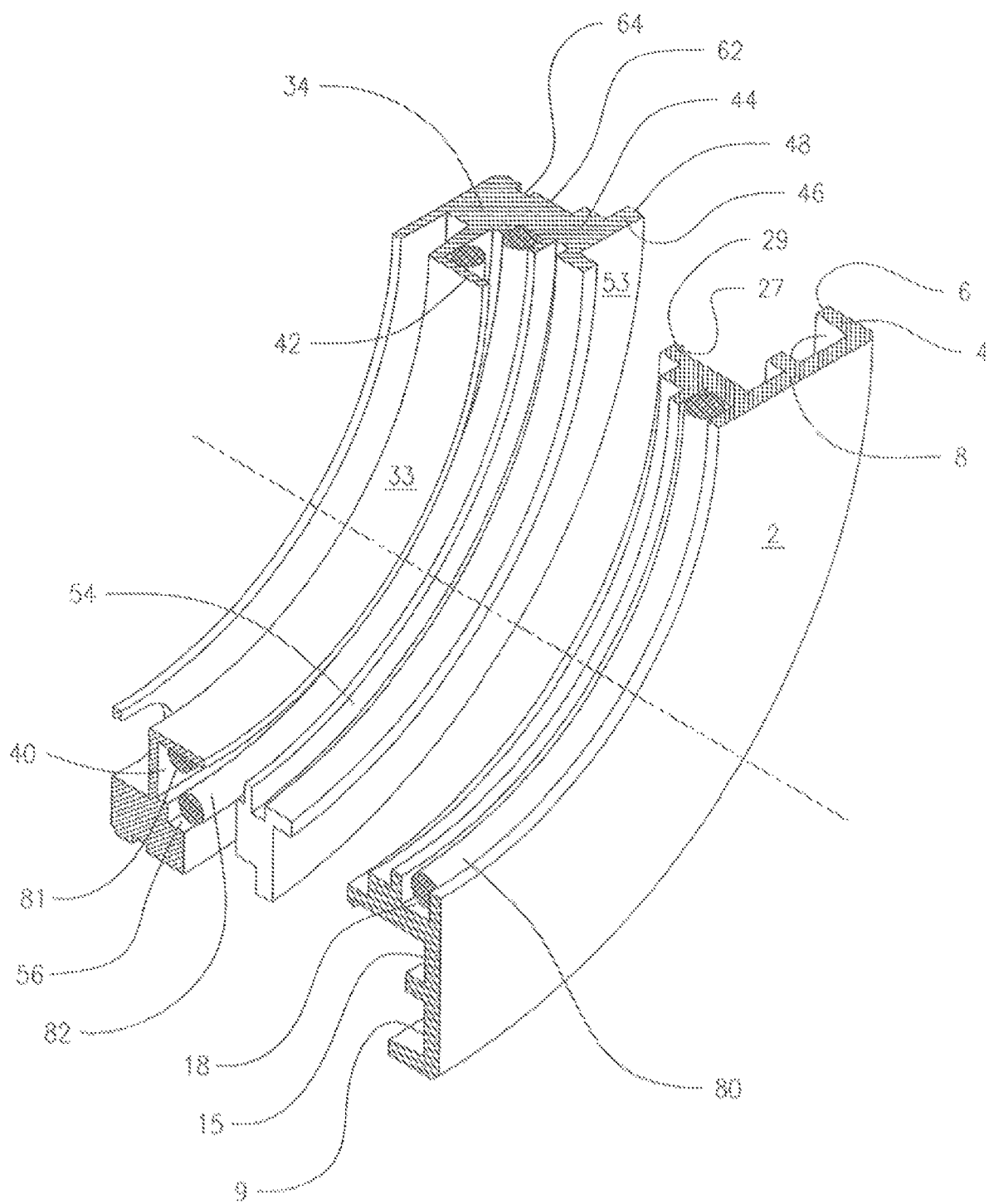
FIG. 5 shows a sectional view of the bottom portions of the rotor separated from the stator.

The outer annular surface 62 of the stator 31 extends axially forward to a stop shoulder 66 that defines a stop when the stator 31 is inserted axially into the receiving bore of the housing H of the rotating equipment, as shown in FIG. 4. The machined stop shoulder 66 also squares up the stator with the housing to ensure proper alignment with the shaft 90.

Figure 3:
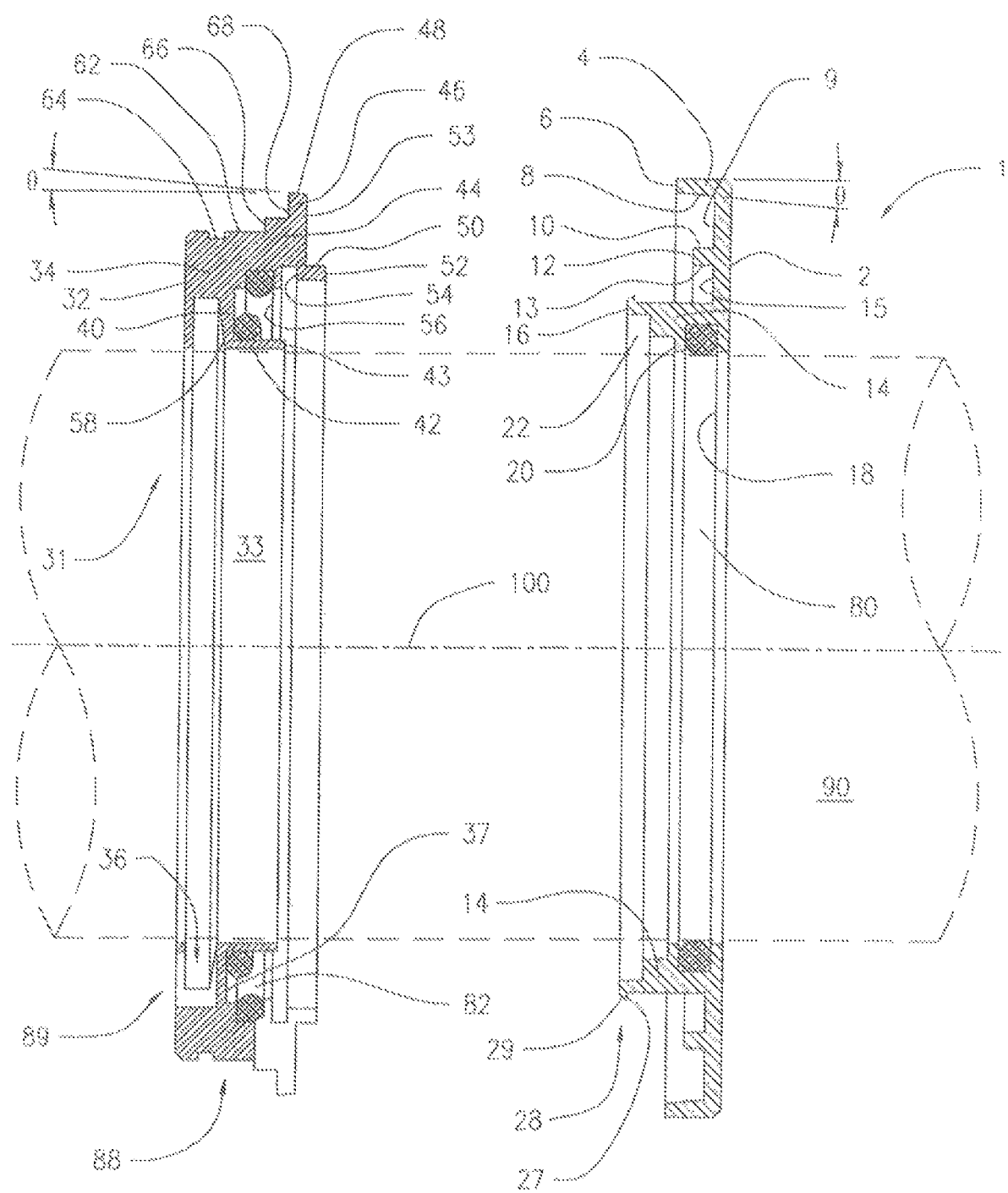
FIG. 3 shows a cross-sectional view of the rotor separated from the stator.

Axially- and radially-extending projections extend from, and grooves are formed into, the body 34 to form interfacing surfaces and define cavities with the confronting face of the rotor. The wall 42 extends forward axially from the distal end of radial wall 40 to define a forward-facing annular groove 37 (FIG. 3). A first annular coalescing seal ring 81 is disposed within an annular cavity defined by the groove 37 of the stator 31 and the groove 22 formed in the rearward (axially) portion of the third projection 14 of the rotor 1. The first annular coalescing seal ring 81 is associated with the stator 31, and does not move or rotate normally (that is, it remains stationary) during dynamic operation of the rotor 1. During dynamic operation, the rotating rotor does not touch or contact the first coalescing seal ring 81. A second annular coalescing seal ring 82 is disposed at least partially within a second annular groove 56 formed radially into the body 34 of the stator. The second annular coalescing seal ring 82 also remains stationary during dynamic operation of the rotor 1. The second coalescing seal ring 82 disposed within groove 56 of the stator 31 is also not touched or contacted by the extending end portion 16 of the third projection 14, including when the rotor 1 and shaft 90 are rotating at operating speed.

A catch 28, with a shoulder 27 and a tapered leading edge 29, extends radially from the end 16 the third projection 14, to provide a means for locking the rotor 1 in operational association with the stator 31, as will be described later.

A forward portion 44 extends both radially and axially from the stator body 34, and includes an annular, outermost, radially-extending projection 46 with a tapered, machined distal edge 48. The distal edge 48 is typically a frustoconical-shaped surface having the acute angle θ relative to the axial reference line 100. A second run-off shoulder 68 is machined axially rearward of the projection 46 to define a channel between the housing H and the distal-most portions of the stator-rotor, to assisting in running off the contaminant liquid away from an entrance into the labyrinth seal.

When the rotor 1 is operationally associated with the stator 31, the machined distal edge 48 defines a tapered annular interface passage 70 with the inner surface 8 of the rotor's distal projection 4 that overlaps the outermost distal edge of the stator. This tapered interface passage defines the initial entry point of a liquid contaminant into the seal between the distal edge of the rotating rotor and the stationary stator. The entrance into and pathway along the interface passage is directed radially inwardly to promote expulsion of contaminant that encroaches into the interface during dynamic operation of the seal.

The forward portion 44 of the stator body 34 also includes a projection 50 with a machined distal end 52, which extends forward axially from the machined radial surface 53. The surface of the distal end 52 and the surface of the machined distal end 52 are substantially perpendicular with the axial reference line 100. When the rotor 1 is operationally associated with the stator 31, the machined distal end 12 of the intermediate projection 10 of the rotor 1 forms a second radial interface passage 72 with the axial surface 53 of the stator, while the distal end 52 of the projection 50 of the stator 31 forms a third radial interface passage 74 with the machined inner surface 15 of the rotor. In addition, the annular inner surface of the intermediate projection 10 confronts and forms a fourth axial interface passage 76 with the annular outer surface of the projection 50.

The projections and grooves of the confronting rotor and stator define a first, outer radially-extending exclusion chamber 24 defined by the distal projection 4, the channel surface 9, and the intermediate projection 10 of the rotor 1, which are rotating during dynamic operation, and the axial surface 53 of the stator 31, which is stationary. The outer exclusion chamber 24 is in fluid communication with the tapered interface passage 70 and the second axial interface passage 72. During operation, any liquid contaminant that passes through the tapered interface passage 70 and into the outer exclusion chamber 24 will be struck and flung outward radially by the rotating intermediate projection 10.

A second, inner exclusion chamber 26 is defined by the projection 50 and forward portion 44 of the stator 31, which are stationary during dynamic operation, and the third projection 14 and the channel surface 15 of the rotor 1, which is rotating. The second, inner exclusion chamber 26 is in fluid communication with the third interface passage 74.

An optional annular contaminant collection groove 54 is formed into the inner surface of the forward portion 44 of the stator 31 that is designed to collect any contaminant liquid which might get through the interface passages 70, 72, 74 and 76, before reaching the second annular coalescing and retainer seal ring 82. The outer exclusion chamber 24 and inner exclusion chamber 26 provide a pair of radially-disposed exclusion chambers that enhance sealing performance. A virtual radial plane perpendicular to the axial reference line 100 can pass through a portion of both the outer exclusion chamber 24 and inner exclusion chamber 26.

The labyrinth seal also includes a means for locking the rotor 1 to the stator 31 after assembly to prevent axial separation of the rotor 1 from the stator 31. Catch 28 and sealing and retainer ring 82 provide a locking means that prevents axial separation of the rotor from the stator when axial adjustments on certain centrifugal process pumps are made or other axial movements or alignments of the shaft are required. The annular groove 56 in the stator body 34 is formed with a width essentially that of the cross-sectional diameter of the sealing member 82, and is formed to a radial depth less than, and typically about one-half, the diameter of the sealing and retainer ring 82. To obtain the locking action, the sealing and retainer ring 82 is inserted within the groove 56 and the stator inserted onto the shaft 90 and within the housing. As the rotor is pressed into assembly with the stator, the elastomeric sealing and retainer ring 82 is deformed by the leading beveled surface 29 of the catch 28, and forced up into the groove 56 until the catch 28 clears past the groove 56, which allows the sealing and retainer ring 82 to expand to its natural shape behind the shoulder 27 of the catch 29. Once in the locked position, the sealing and retainer ring 82 blocks relative axial movement of the rotor away from the stator, unless excessive axial force is applies to the rotor that causes the shoulder 27 of the catch to shear through the elastomeric material of the seal 82. Further details of such a locking mechanism are described in U.S. Pat. No. 5,378,000, the disclosure of which is incorporated by reference in its entirety.

The stator 31 is designed and configured to prevent migration of lubricant into the labyrinth seal, and to efficiently return the lubricant to the sump of the equipment. Typically the viscosity of the lubricant prevents migration into the narrow interface passages of the labyrinth seal. Any lubricant that may migrate along interface passage between the shaft 90 and the lateral wall 42 confronts the machined interface 79 between the end 43 of the lateral wall 42 of the stator and the inner shoulder 20 of the proximal projection 14 of the rotor, and passes through axial interface 78, before arriving at the coalescing seal 81 disposed within the annular cavity formed by the groove 37 of the stator 31 and the groove 22 of the proximal projection 14.

The device includes a contact avoidance interface between the stator and the rotor that is positioned in an intermediate portion of the labyrinth pathway. The purpose of the contact avoidance interface is to provide a first interface of contact of the rotor with the stationary stator, in the event that the rotor, though fixed to the shaft 90, moves axially toward the stator during dynamic operation. Preferably, the contact avoidance interface is disposed inboard in the labyrinth seal pathway, and typically inboard of at least two contaminant-excluding interfaces, for example interface 70 and 72, and inboard of at least one lubricant-excluding interface, for example, interface 79 or coalescing seal 81. This feature provides a dedicated surface for any contact and wear associated with dynamic contact of the rotor with the stator, and prevents the projection members and surfaces forming the other sealing interfaces, such as interfaces 70 and 72, from making contact during dynamic operation of the seal, thereby avoiding wear and damage to the interfaces and maintaining exclusion performance of the seal. In the illustrated embodiment shown in the Figures, the contact avoidance interface consists of third axial interface passage 74 defined between the distal end 52 of the projection 50 of the stator 31, and the machined inner surface of forward wall 2 of the rotor. The end 52 of projection 50 is machined to a dimension so that it first contacts the inner surface of forward wall 2 of the rotor when the rotor moves axially toward the stator. Alternatively, the contact avoidance interface may consist of an axial projection of the rotor, and a complementary surface of the stator.

A bottom portion of the forward portion 44 of the stator body 34 of the stator 31 is removed by well known means to provide a contaminant drain 88, as shown in FIGS. 2a and 2b. Any contaminant liquid, such as washing water dispensed from high-pressure hoses during routine cleanup, or other liquids or vapors in the environment that pass through or to the interface passages 70, 72, 74 and 76, and collects in the annular outer chamber 24 and inner chamber 26, or in the annular groove 54, passes downward and drains from the drain 88. The annular distal projection 4 that extends entirely around the circumference of the rotor, as shown in FIG. 4, has a downwardly-sloping surface 8 at the bottom helps to drain contaminant liquid out from the seal. The interface gaps 70, 72, 74 and 76 are preferably machined to a high tolerance and narrowest spacing possible.

Figure 6:
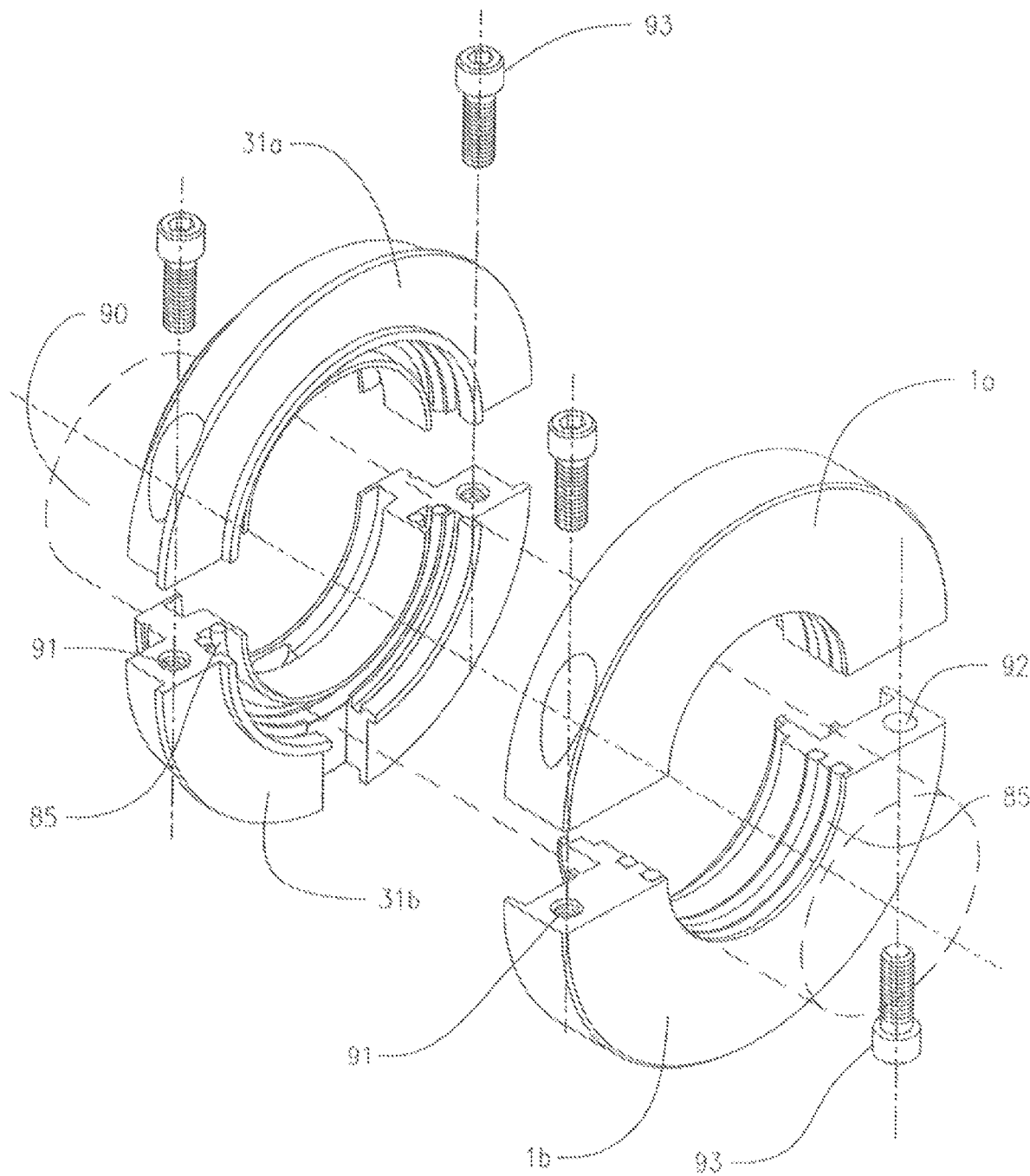
FIG. 6 shows a split configuration of the rotor and the stator.

FIG. 6 shows another embodiment of the rotor and stator in a split configuration, which allows the seal to be installed on an equipment shaft in place, without needing to slip the rotor or stator over the end of the shaft 90. The rotor includes opposed and substantially identical upper rotor portion 1a and lower rotor portion 1b, each including a threaded bore 91 and a through bore 92 formed in the opposed portions of the rotor body, which receive threaded fasteners 93 for securing the portions 1a and 1b to the shaft 90. The stator includes opposed upper stator portion 31a that has two opposed through bores 92, and lower stator portion 31b that has two opposed threaded bores 91, for receiving threaded fasteners 93 for securing the portions 31a and 31b to the shaft 90. Lengths of o-ring cord stock 85 are placed into the respective grooves in the upper rotor 1a and lower rotor 1b, and upper stator 31a and lower stator 31b portions, to form the elastomeric seal members.

Figure 7:
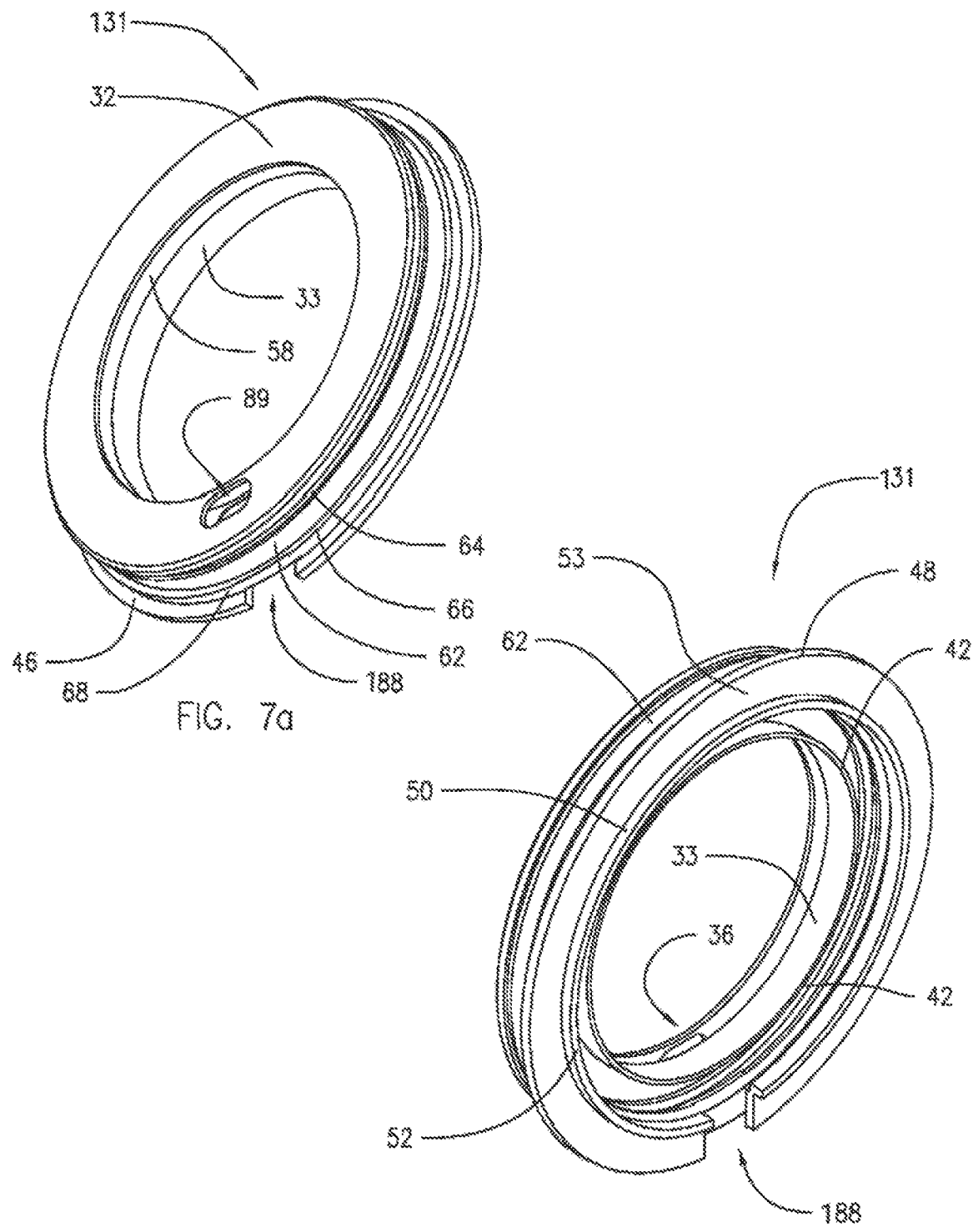
FIGS. 7a and 7b show perspective views of the outer face and inner face, respectively, of an alternative stator.
Figure 8:
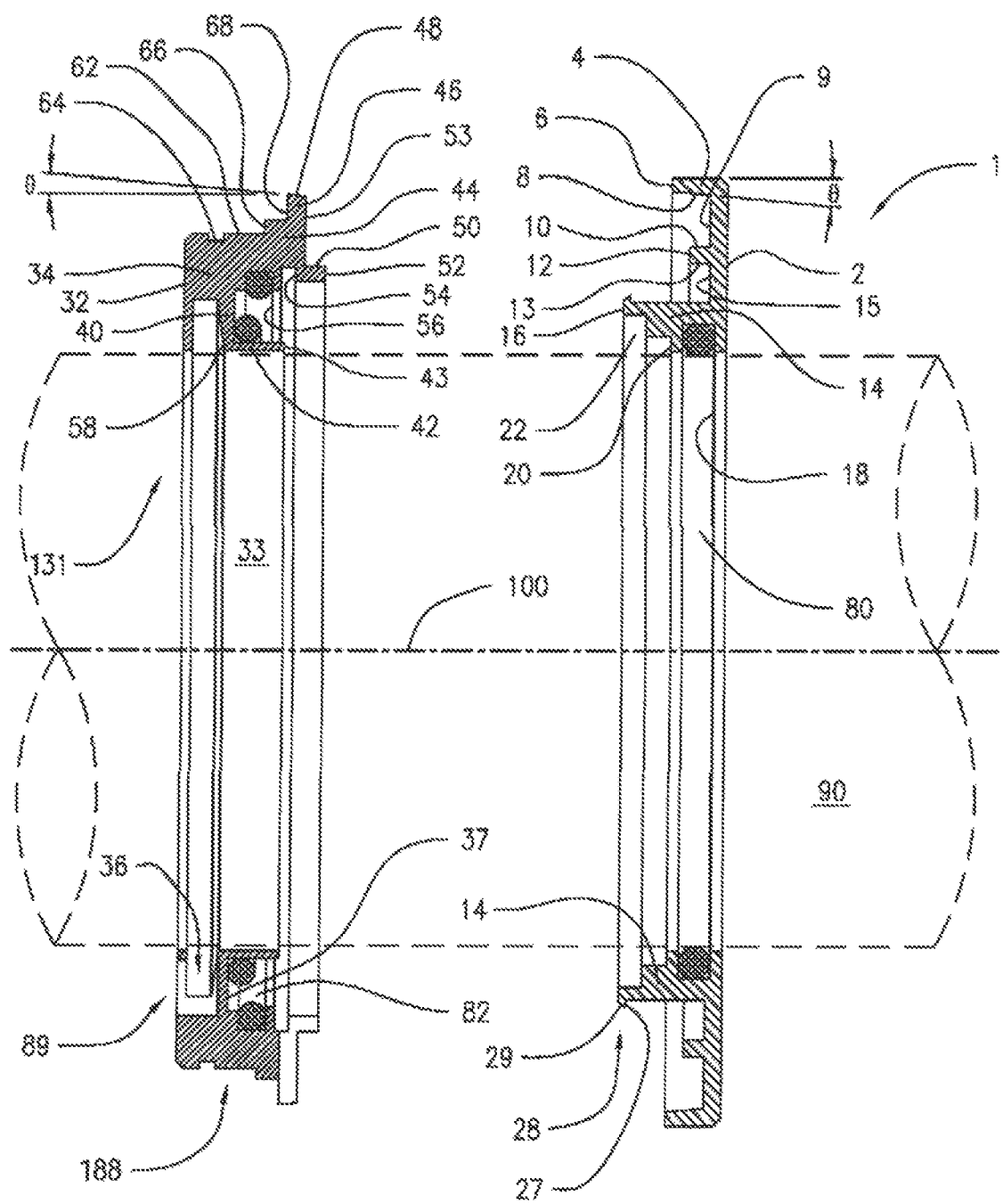
FIG. 8 shows a cross-sectional view of the rotor separated from the stator of FIGS. 2a and 2b.
Figure 9:
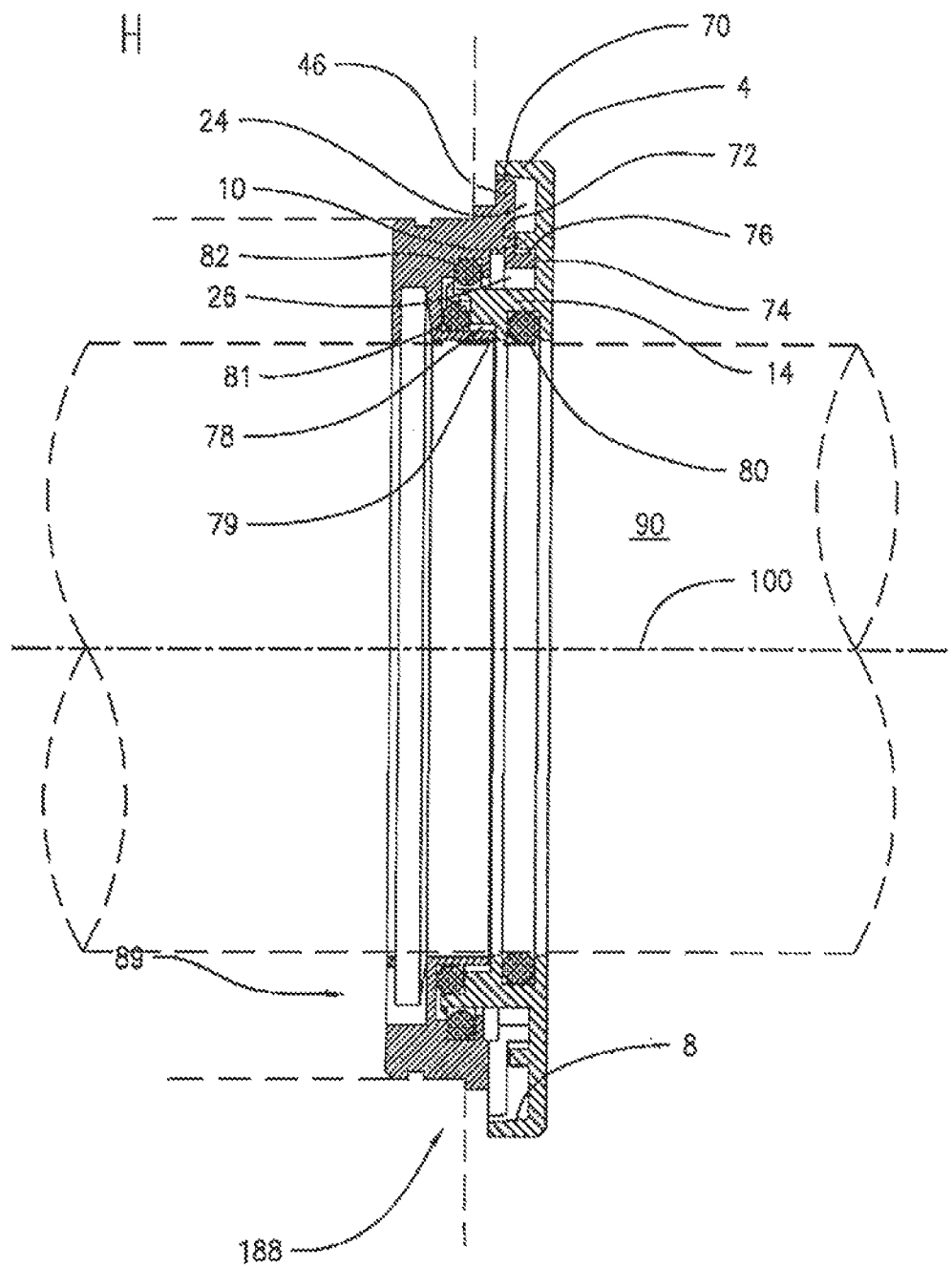
FIG. 9 shows a cross-sectional view of the rotor engaged with the stator of FIG. 8 on a shaft.

FIGS. 7a, 7b, 8 and 9 show a stator 131, similar to the aforementioned stator 31 shown in FIGS. 2a and 2b, with common features illustrated and numbers the same. Similar to the above embodiment, the bottom portion of the forward portion 44 of the stator body 34 of the stator 131 is removed by well known means to provide a contaminant drain 188, as shown in FIGS. 7a and 7b. Unlike the embodiment illustrated in FIGS. 2a and 2b, the containment drain 188 does not remove any portion of the annular stop shoulder 66.

It is understood that modifications to the invention may be made as might occur to one with skill in the field of the invention within the scope of the appended claims. All embodiments contemplated hereunder that achieve the benefits of the invention have therefore not been shown in complete detail. Other embodiments may be developed without departing from the spirit of the invention or from the scope of the appended claims.

Because the instant application is a continuation application, to the extent any amendments, characterizations, or other assertions previously made (in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A labyrinth seal including a stator and a non-contacting rotor, and including at least one annular elastomeric seal, and at least one interface passage disposed between the confronting surfaces of the stator and rotor, the at least one interface passage including a radially-outermost annular interface passage between an annular, outermost, radially-extending projection of the stator and an annular rearwardly-extending distal projection of the rotor that includes an annular inner surface that overlaps the radially-extending projection of the stator, the radially-outermost annular interface passage tapering outwardly and rearwardly at an acute angle of at least 2°, and up to 15°, relative to an axial reference line.

2. The labyrinth seal according to claim 1, wherein the at least one annular elastomeric seal is stationary with the stator during dynamic operation of the rotor, and is not contacted by a surface of the rotor during dynamic operation.

3. The labyrinth seal according to claim 1 wherein the confronting surfaces of the stator and rotor define a radially-outside exclusion chamber that is defined in part by a radially-inboard projection of the rotor, for expelling contaminant liquid outward radially, to enhance sealing performance.

4. The labyrinth seal according to claim 1 further including a contact avoidance interface disposed in an intermediate portion of the labyrinth pathway between the stator and the rotor, that is inboard of at least two contaminant-excluding interfaces and at least one lubricant-excluding interface, that provides a first interface of contact between the confronting surfaces of the stator and rotor in the event the rotor moves axially toward the stator during dynamic operation of the seal.

5. The labyrinth seal according to claim 1 wherein the contact avoidance interface comprises an axial projection of the stator.

6. A labyrinth seal including a stator and a rotor having a plurality of interface passages disposed between the confronting surfaces of the stator and rotor,
  i) the stator including a forward portion including an annular, outermost, radially-extending projection having a distal edge and a forward-facing radial surface;
  ii) the rotor including an annular forward wall, an annular rearwardly-extending distal projection having an inner annular surface, and an intermediate annular projection extending rearwardly from the forward wall and having a distal end;
  iii) wherein the plurality of interface passages includes two contaminant-excluding interface passages comprising (a) a radially-outermost annular interface passage between the distal edge of the annular, outermost, radially-extending projection of the stator and the inner annular surface of the annular rearwardly-extending distal projection of the rotor that overlaps the annular, outermost, radially-extending projection of the stator, and (b) an intermediate interface passage between the distal end of the intermediate annular projection of the rotor and the forward-facing radial surface of the stator; and
  iv) further having a contact avoidance interface disposed in an intermediate portion of the labyrinth pathway that is inboard of the two contaminant-excluding interface passages, the contact avoidance interface being formed by and defined between the stator and rotor, to provide a first interface of contact between the confronting surfaces of the stator and rotor in the event the rotor moves axially toward the stator during dynamic operation of the seal.

7. The labyrinth seal according to claim 6, wherein the contact avoidance interface is disposed in the intermediate portion of the labyrinth pathway that is outboard of at least one lubricant-excluding interface.

8. The labyrinth seal according to claim 1 wherein the contact avoidance interface is formed by and defined between a distal end of an axial projection of the rotor and a complementary surface of the stator.

9. The labyrinth seal according to claim 1 wherein the contact avoidance interface is formed by and defined between a distal end of an axial projection of the stator and a complementary surface of the rotor.

* * * * *